United States Patent
Dai et al.

(10) Patent No.: US 10,630,922 B1
(45) Date of Patent: Apr. 21, 2020

(54) LOCAL EXPOSURE SENSOR AND METHOD FOR OPERATING THE SAME

(71) Applicant: Omnivision Technologies, Inc., Santa Clara, CA (US)

(72) Inventors: Tiejun Dai, Santa Clara, CA (US); Chengming Liu, Fremont, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 33 days.

(21) Appl. No.: 16/157,978

(22) Filed: Oct. 11, 2018

(51) Int. Cl.
| | |
|---|---|
| *H04N 5/359* | (2011.01) |
| *H04N 5/353* | (2011.01) |
| *H04N 5/369* | (2011.01) |
| *H04N 9/04* | (2006.01) |
| *H04N 5/3745* | (2011.01) |
| *H04N 5/911* | (2006.01) |
| *H04N 5/355* | (2011.01) |
| *H04N 5/378* | (2011.01) |

(52) U.S. Cl.
CPC ......... *H04N 5/3597* (2013.01); *H04N 5/3535* (2013.01); *H04N 5/35554* (2013.01); *H04N 5/3696* (2013.01); *H04N 5/378* (2013.01); *H04N 5/37452* (2013.01); *H04N 5/911* (2013.01); *H04N 9/0451* (2018.08)

(58) Field of Classification Search
CPC ...... H04N 5/3597; H04N 5/378; H04N 5/911; H04N 5/3696; H04N 5/37452; H04N 5/35554; H04N 5/3535; H04N 9/0451
See application file for complete search history.

(56) References Cited

U.S. PATENT DOCUMENTS

| | | | | |
|---|---|---|---|---|
| 2014/0313350 | A1* | 10/2014 | Keelan | H04N 5/3651 348/188 |
| 2015/0271461 | A1* | 9/2015 | Hayashi | H04N 5/359 348/223.1 |
| 2018/0075587 | A1* | 3/2018 | Swami | H04N 5/265 |

\* cited by examiner

*Primary Examiner* — Gevell V Selby
(74) *Attorney, Agent, or Firm* — Muncy, Geissler, Olds & Lowe, P.C.

(57) ABSTRACT

A high dynamic range imaging sensor includes a pixel array of pixel cells, a readout circuitry, a function logic and a control circuitry. Each pixel cell comprises one of a normal pixel and a base pixel, and each M rows by N columns pixels defines a pixel subarray. Each pixel subarray includes at least three normal pixels and at least one base pixel. The readout circuitry is coupled to read image data out from a plurality of pixels of the pixel array. The readout circuitry includes an Analog-to-Digital Converter associated to respective readout column. The function logic is coupled to receive the digital image data from the readout circuitry. The control circuitry is coupled to receive exposure levels from the function logic and to output each applied exposure level assigned to respective pixel subarray of the pixel array to control an exposure time of each pixel.

24 Claims, 9 Drawing Sheets

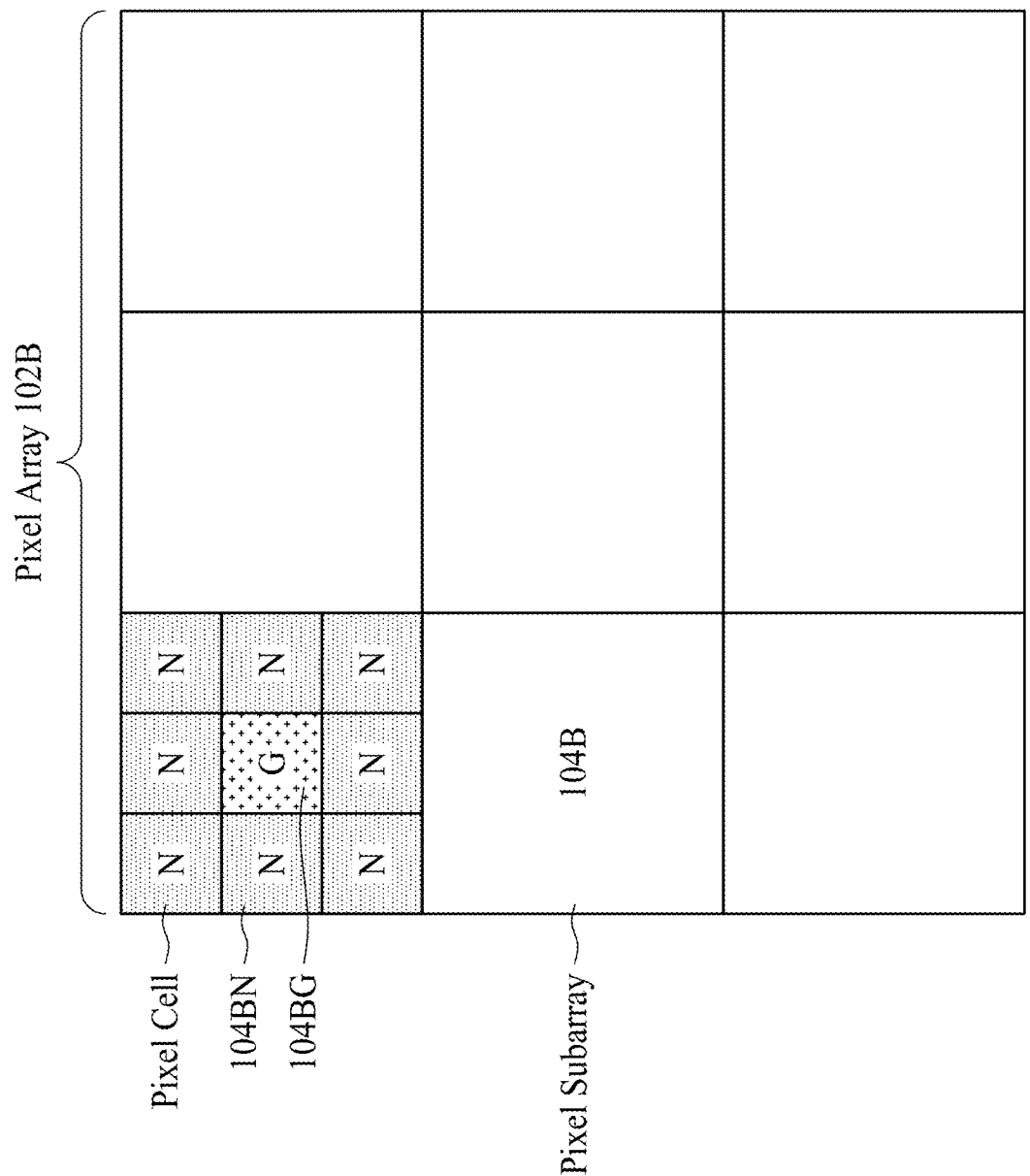

US 10,630,922 B1

LOCAL EXPOSURE SENSOR AND METHOD FOR OPERATING THE SAME

BACKGROUND

1. Technical Field

The present disclosure relates to a local exposure sensor and a method for operating the same, and to a local exposure sensor for removing ghost images and a method for operating the same.

2. Description of the Related Art

An image capture device includes an image sensor and an imaging lens. The imaging lens directs light beams onto the image sensor. The light beams converted into electric signals by the image sensor to form an image. The electric signals are output from the image capture device to other components in an electronic product. The electronic product may include, for example, a mobile phone, a computer, a digital camera, a medical device, or the like.

It would be challenging to operate an image sensor perform over a relatively great span of brightness (e.g. a greater range of luminance levels) due to the trend of miniaturization of electronic products. Such imaging technique may also be referred to as a high dynamic range imaging (HDRI or HDR) technique.

High dynamic range imaging is a critical feature in various applications, such as automotive, machine vision, etc. Some approaches are implemented to improve the dynamic range performance of image sensor(s) to capture image(s) of a still object. However, when an object (or image sensor) moves from a relatively dark environment to a relatively bright environment, a ghost image (or ghosting artifact) may appear in the captured image. It is desirable to address such issue.

SUMMARY

In accordance with an aspect of the present disclosure, a high dynamic range (HDR) imaging sensor includes a pixel array of pixel cells, a readout circuitry, a function logic and a control circuitry. Each pixel cell has one of a normal pixel and a base pixel, and each M rows by N columns pixels defines a pixel subarray. Each pixel subarray comprises at least three normal pixels and at least one base pixel. The readout circuitry is coupled to read image data out from a plurality of pixels of the pixel array. The readout circuitry includes an Analog-to-Digital Converter (ADC) associated to respective readout column and is configured to convert the analog image signal to digital image data. The function logic is coupled to receive the digital image data from the readout circuitry. The function logic includes an image memory and a ghost image remover. The image memory is coupled to store the image data received from the readout circuitry. The ghost image remover is coupled to read image data stored in the image memory and write reconstructed data back to the image memory. The control circuitry is coupled to receive exposure levels from the function logic and to output each applied exposure level assigned to respective pixel subarray of the pixel array to control an exposure time of each pixel.

In accordance another aspect of the present disclosure, a method of removing ghost image using base exposure pixel includes: presetting each pixel cell of a pixel array with an exposure level assigned to respective pixel subarrays where said pixel resides, wherein said exposure levels are read out from the exposure level memory by the control circuitry; reading normal image value of a normal pixel from a normal pixel memory by an normal pixel data reconstructor, wherein the normal pixel belongs to a given subarray; reading base image value of a base pixel from a base pixel memory by an base pixel data reconstructor, wherein the base pixel of the normal pixel is the pixel that resides the closest in distance to the normal pixel of the same color and of the same subarray; comparing the normal image value to a reference value by a comparator; and comparing the base image value to a reference value by the comparator.

In accordance another aspect of the present disclosure, a high dynamic range (HDR) imaging sensor includes a pixel array of pixel cells, a readout circuitry, a function logic, a control circuitry, a normal exposure control line, a base exposure control line and an image application device. Each pixel cell has one of a normal pixel and a base pixel, and each M rows by N columns pixels defines a pixel subarray. Each pixel subarray has at least three normal pixels and at least one base pixel. The readout circuitry is coupled to read image data out from a plurality of pixels of the pixel array. The readout circuitry has an Analog-to-Digital Converter (ADC) associated to respective readout column to convert the analog image signal to digital image data. The function logic is coupled to receive the digital image data from the readout circuitry. The function logic has an image memory and a ghost image remover. The image memory is coupled to store the image data received from the readout circuitry. The ghost image remover is coupled to read image data stored in the image memory and write reconstructed data back to the image memory. The control circuitry is coupled to receive exposure levels from the function logic and to output each applied exposure level assigned to respective pixel subarray of the pixel array to control an exposure time of each pixel. The normal exposure control line is coupled to pass the exposure time from the control circuitry to each pixel row of the pixel array. The base exposure control line is coupled to pass the exposure time from the control circuitry to each pixel row of the pixel array that includes both the normal pixel and the base pixel. The exposure time of each base pixel is controlled separately and in parallel to the exposure time of each normal pixel in the same row. The image application device is coupled to receive image data from the image memory of the function logic and provide image data to one of a display and a data transmitter.

BRIEF DESCRIPTION OF THE DRAWINGS

FIG. 1D illustrates an example of the pixel array in accordance with some embodiments of the present disclosure.

Figure 1A:
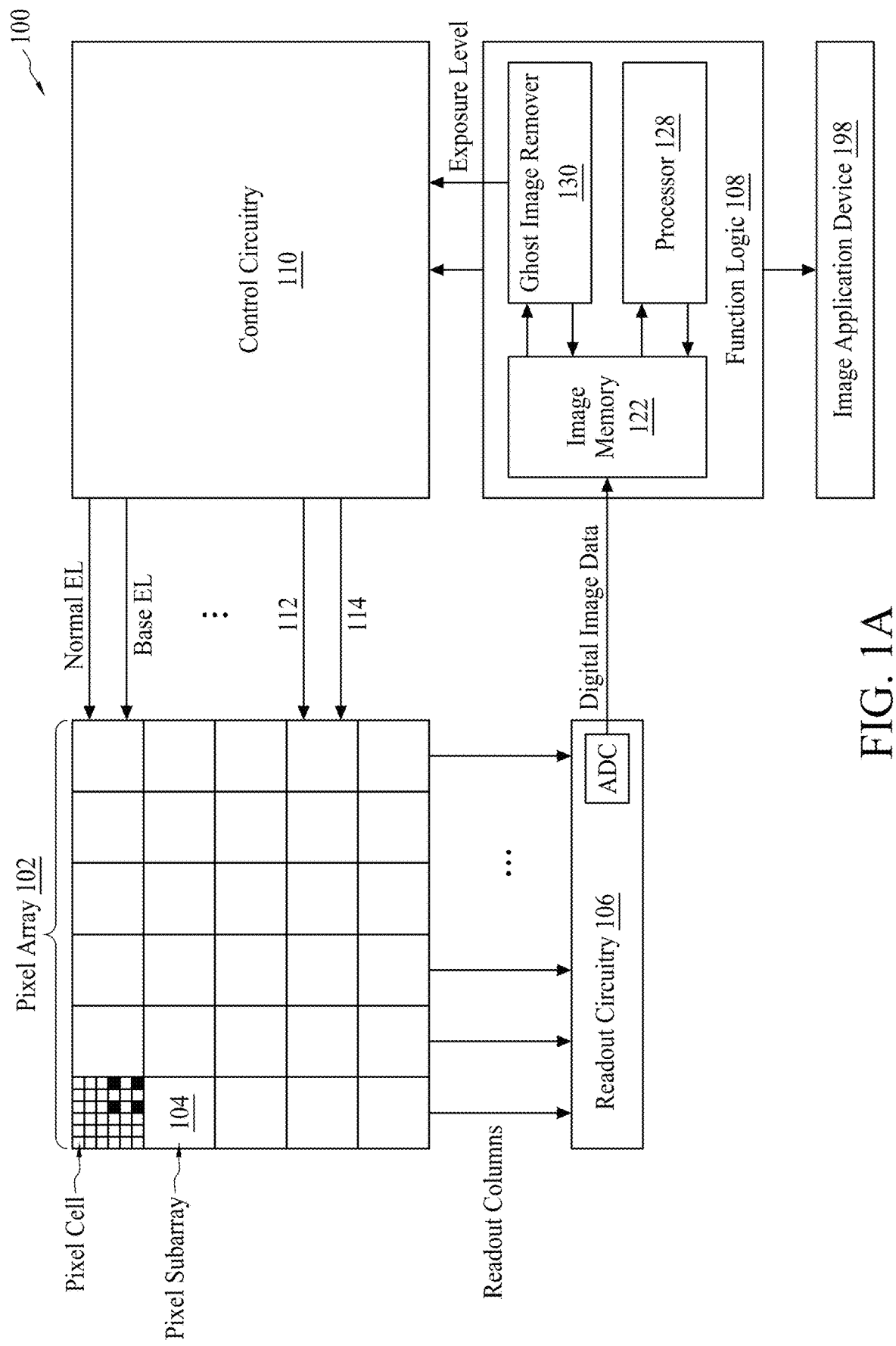
FIG. 1A is a block diagram illustrating an exemplary imaging system in accordance with some embodiments of the present disclosure.

Common reference numerals are used throughout the drawings and the detailed description to indicate the same or similar components. The present disclosure can be best understood from the following detailed description taken in conjunction with the accompanying drawings.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

FIG. 1A is a block diagram illustrating an exemplary imaging system 100 in accordance with some embodiments of the present disclosure. The imaging system 100 includes a pixel array 102, readout circuitry 106, function logic 108, control circuitry 110 and an image application device 198.

The pixel 102 is configured to receive lights from an object, an environment and/or a person. The pixel array 102 includes pixel circuits having a high dynamic range read out architecture using in-frame multi-bit exposure in accordance with the teachings of the present disclosure. The pixel array 102 includes a plurality of pixel subarrays 104. Each pixel subarray 104 includes M×N pixel cells (or pixels), where M and N are integers greater than 1.

Figure 1B:
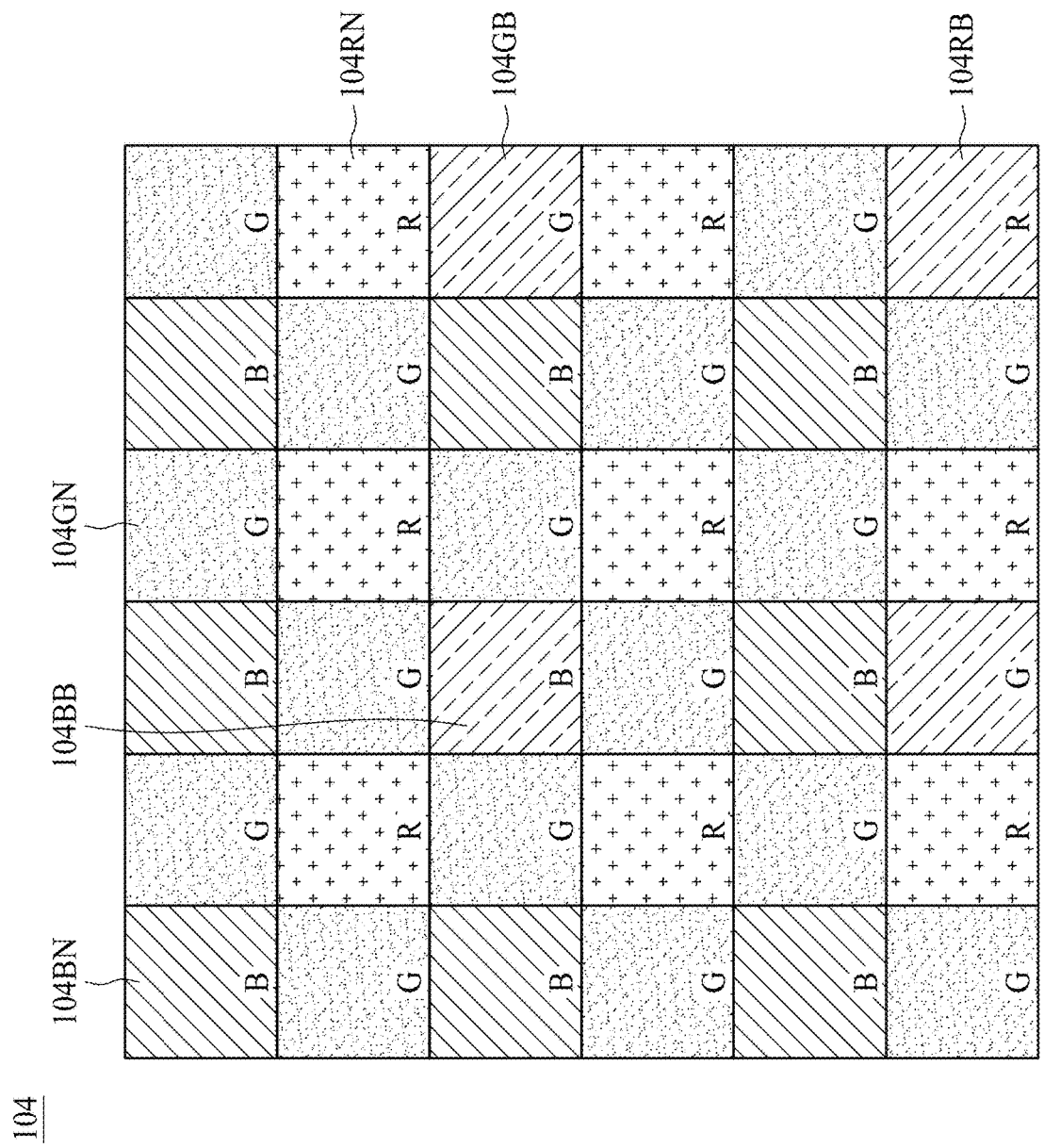
FIG. 1B illustrates an example of the pixel subarray illustrated in FIG. 1A in accordance with some embodiments of the present disclosure.

Referring to FIG. 1B, which illustrates an example of the pixel subarray illustrated in FIG. 1A in accordance with some embodiments of the present disclosure. The pixel subarray 104 includes 36 pixel cells arranged by a 6×6 matrix. The pixel subarray 104 may include more or less pixels cells other than 36 in accordance with some other embodiments of the present disclosure. Size or pattern of the pixel subarray 104 as shown in FIG. 1B may be varied in some other embodiments of the present disclosure.

The pixel subarray 104 includes normal pixel cells (e.g., 104BN, 104GN and 104RN) and base pixel cells (e.g., 104BB, 104GB and 104RB). For example, each pixel cell in the pixel subarray 104 is or includes one of the normal pixel cell and the base pixel cell (or reference pixel cell). In some embodiments, the pixel subarray 104 includes at least one blue normal pixel cell 104BN, at least one green normal pixel cell 104GN and at least one red normal pixel cell 104RN, at least one blue base pixel cell 104BB, at least one green base pixel cell 104GB and at least one red base pixel cell 104RB. In other embodiment, the pixel subarray 104 includes a Bayer pattern. For example, the pixel subarray 104 includes at least one blue base pixel cell 104BB, at least two green base pixel cells 104GB and at least one red pixel cell 104RB. In other embodiments, the pixel subarray 104 includes at least three normal pixel cells and at least one base pixel cell. In some embodiments, a ratio of the number of the base pixel cells in the pixel subarray 104 to the total number of pixel cells (including base pixel cells and normal pixel cells) in the pixel subarray 104 is in a range from about 1/25 to about 1/9 (i.e., about 4% to about 11%).

In some embodiments, each of the base pixel cells (e.g., 104BB, 104GB and 104RB) is assigned to a minimum exposure level used in the whole pixel array 102. For example, each base pixel cell of the pixel array 102 is set to a common base exposure level that is the minimum level among exposure levels applied to all pixel cells of the pixel array 102. The minimum exposure level may be obtained or calculated based on the exposure levels of the previous frame or obtained image. If no previous frame is available, the minimum exposure level is determined by default.

Figure 1C:
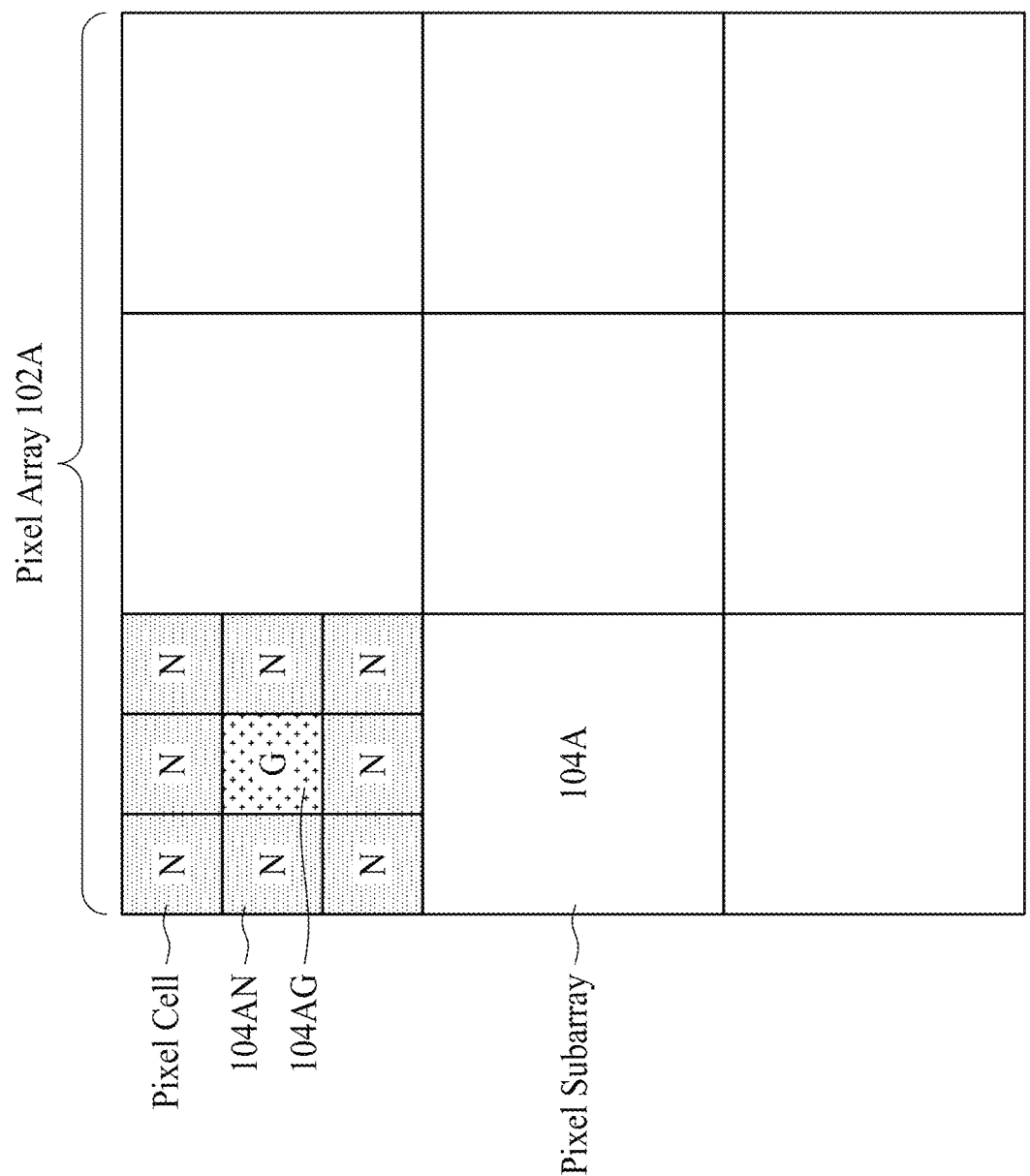
FIG. 1C illustrates an example of the pixel array in accordance with some embodiments of the present disclosure.

In some embodiments, The imaging system 100 can be used for black and while (BW) sensors. For example, the pixel array 102 of the imaging system 100 can be replaced by a pixel array 102A as shown in FIG. 1C. The pixel 102A includes a plurality of block and white pixels and is configured to receive lights from an object, an environment and/or a person. The pixel array 102A includes a plurality of pixel subarrays 104A. Each pixel subarray 104A includes M×N pixel cells (or pixels), where M and N are integers greater than 1. As shown in FIG. 1C, the pixel subarray 104A includes 9 pixel cells arranged by a 3×3 matrix. The pixel subarray 104A may include more or less pixels cells other than 9 in accordance with some other embodiments of the present disclosure. Size or pattern of the pixel subarray 104A as shown in FIG. 1C may be varied in some other embodiments of the present disclosure.

Each pixel subarray 104A includes normal pixel cells 104AN and at least one base pixel cell 104AG. In some embodiments, the base pixel cell 104AG is surrounded by the normal pixel cells 104AN. In some embodiments, a ratio of the number of the base pixel cell in the pixel subarray 104A to the total number of pixel cells (including base pixel cells and normal pixel cells) in the pixel subarray 104A is in a range from about 1/25 to about 1/4 (i.e., about 4% to about 25%).

In some embodiments, the base pixel cell 104AG is assigned to a minimum exposure level used in the whole pixel array 102A. For example, each base pixel cell of the pixel array 102A is set to a common base exposure level that is the minimum level among exposure levels applied to all pixel cells of the pixel array 102A. The minimum exposure level may be obtained or calculated based on the exposure levels of the previous frame or obtained image. If no previous frame is available, the minimum exposure level is determined by default.

In some embodiments, the imaging system 100 can be used for infrared (IR) sensors. For example, the pixel array 102 of the imaging system 100 can be replaced by a pixel array 102B as shown in FIG. 1D. The pixel 102B includes a plurality of IR pixels and is configured to receive lights from an object, an environment and/or a person. The pixel array 102B includes a plurality of pixel subarrays 104B. Each pixel subarray 104B includes M×N pixel cells (or pixels), where M and N are integers greater than 1. As shown in FIG. 1D, the pixel subarray 104B includes 9 pixel cells arranged by a 3×3 matrix. The pixel subarray 104B may include more or less pixels cells other than 9 in accordance with some other embodiments of the present disclosure. Size or pattern of the pixel subarray 104B as shown in FIG. 1D may be varied in some other embodiments of the present disclosure.

Each pixel subarray 104B includes normal pixel cells 104BN and at least one base pixel cell 104BG. In some embodiments, the base pixel cell 104BG is surrounded by the normal pixel cells 104BN. In some embodiments, a ratio of the number of the base pixel cell in the pixel subarray 104B to the total number of pixel cells (including base pixel cells and normal pixel cells) in the pixel subarray 104B is in a range from about 1/25 to about 1/4 (i.e., about 4% to about 25%).

In some embodiments, the base pixel cell 104BG is assigned to a minimum exposure level used in the whole pixel array 102B. For example, each base pixel cell of the pixel array 102B is set to a common base exposure level that is the minimum level among exposure levels applied to all pixel cells of the pixel array 102B. The minimum exposure level may be obtained or calculated based on the exposure levels of the previous frame or obtained image. If no previous frame is available, the minimum exposure level is determined by default.

Referring back to FIG. 1A, the readout circuitry 106 is coupled to or connected to the pixel array 102 to read out image data from the plurality of pixel circuits of pixel array 100. In some embodiments, the readout circuitry 106 may include amplification circuitry, analog-to-digital conversion (ADC) circuitry or otherwise. The ADC conversion circuitry of the readout circuitry 106 is associated to (e.g., connected to) respective readout column to convert the analog image signal to digital image data. In some embodiments, the image data that is read out by the readout circuitry 106 is transferred to function logic 108.

The function logic 108 is connected to or coupled to the readout circuitry 106 to receive the digital image data from the readout circuitry 106. The function logic 108 is configured to store the image data and/or to manipulate the image data by applying post image effects (e.g., crop, rotate, remove red eye, adjust brightness, adjust contrast, remove ghost image or otherwise). In some embodiments, the function logic 108 includes an image memory 122, a processor 128 and a ghost image remover 130. The image memory 122 is configured to store the digital image data received from the readout circuitry 106. The processor 128 is connected to the image memory 122 and configured to process the image data stored in the image memory 122. The ghost image remover 130 is coupled to the image memory 122 and configured to read image data stored in the image memory 122 and to write reconstructed data back to the image memory 122. In some embodiments, the function or operations performed by the processor 128 can be performed by the ghost image remover 130, and vice versa. For example, the processor 128 may be integrated with the ghost image remover 130.

Figure 2:
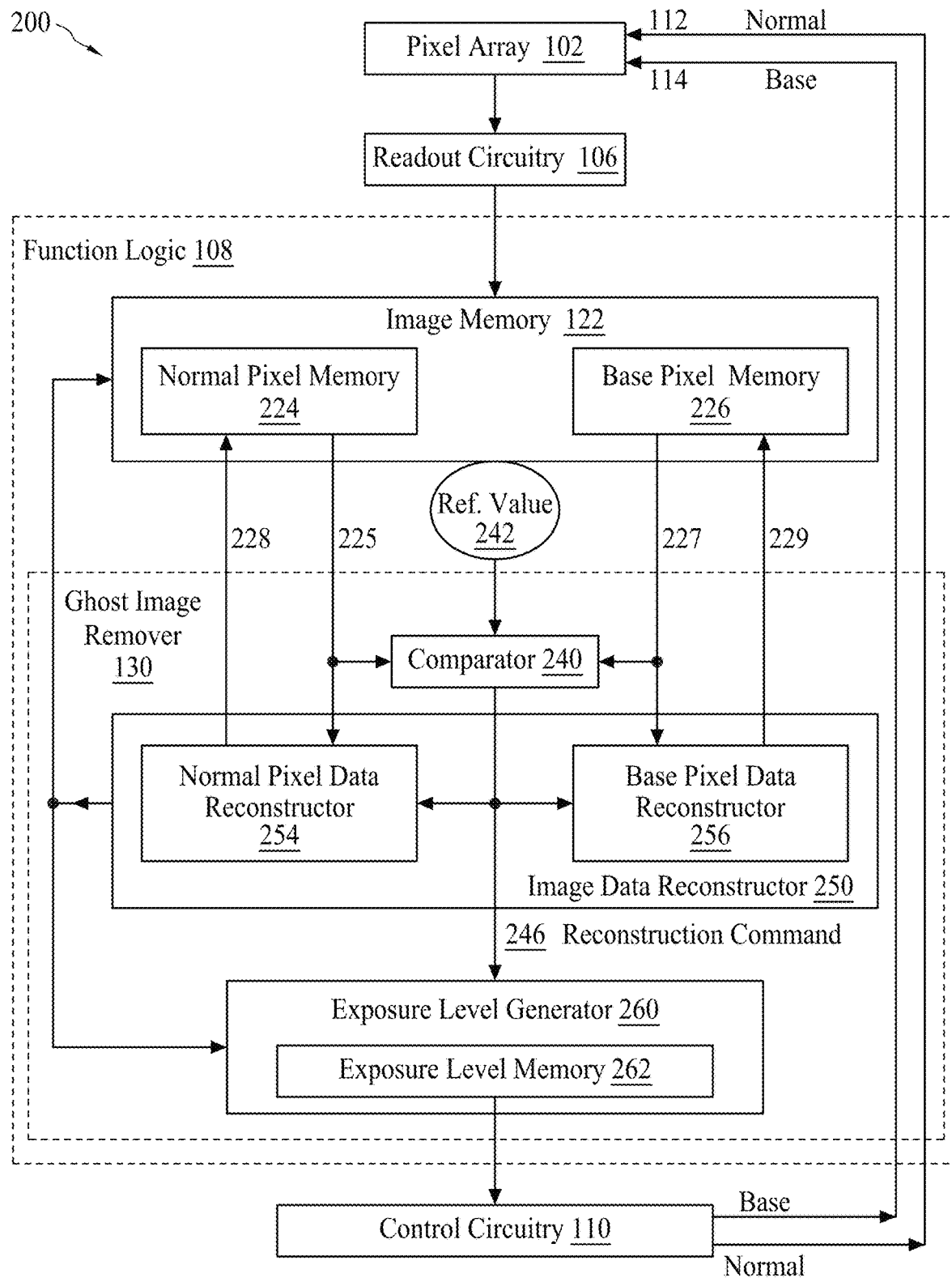
FIG. 2 is a block diagram illustrating an exemplary imaging system in accordance with some embodiments of the present disclosure.

FIG. 2 is a block diagram illustrating an exemplary imaging system 200 in accordance with some embodiments of the present disclosure.

The image memory 122 of the function logic 108 further includes a normal pixel memory 224 and a base pixel memory 226. The normal pixel memory 224 is coupled to store normal pixel data and to transmit normal pixel data to the ghost image remover 130 for reconstruction. The normal pixel memory 224 is further coupled to receive the reconstructed normal pixel data from the ghost image remover 130 to overwrite the normal pixel data stored in the normal pixel memory 224. The base pixel memory 226 is coupled to store base pixel data and to transmit base pixel data to the ghost image remover 130 for reconstruction. The base pixel memory 226 is further coupled to receive the reconstructed base pixel data from the ghost image remover 130 to overwrite the base pixel data stored in the base pixel memory 226.

Still referring to FIG. 2, the ghost image remover 130 of the function logic 108 further includes a comparator 240, an image data reconstructor 250 and an exposure level generator 260. The comparator 240 is configured to compare image data with a reference value 242 and to output a reconstruction command 246. In some embodiments, the comparator 240 is configured to compare the normal pixel and the base pixel data to the reference value 242 and to generate respective comparing results. The comparator 240 is configured to output the reconstruction command 246 based on the comparing results. In some embodiments, the reference value 242 is the maximum value of the upper digitization limit of the ADC circuitry of the readout circuitry 106.

The image data reconstructor 250 includes a normal pixel data reconstructor 254 and a base pixel data reconstructor 256. The normal pixel data reconstructor 254 is configured to receive the reconstruction command 246 and to generate the reconstructed normal pixel data based on the reconstruction command 246. The normal pixel data reconstructor 254 is configured to transmit the reconstructed normal pixel data to the normal pixel memory 224 in the image memory 122 to overwrite the normal pixel memory 224. The base pixel data reconstructor 256 is configured to receive the reconstruction command 246 and to generate the reconstructed base pixel data based on the reconstruction command 246. The base pixel data reconstructor 256 is configured to transmit the reconstructed base pixel data to the base pixel memory 226 in the image memory 122 to overwrite the base pixel memory 226.

The exposure level generator 260 is coupled to the comparator 240 to receive the reconstruction command 246 and to store exposure levels. In some embodiments, the exposure levels are stored in an exposure level memory 262. Each exposure level corresponds to a different exposure time assigned to respective pixel subarray 104 based on which pixel subarray 104 the reconstructed pixel data (i.e., the reconstructed normal pixel data and the reconstructed base pixel data) is read from the image memory 122. The exposure level generator 260 is configured to output the exposure levels to the control circuitry 110.

The control circuitry 110 is coupled to the function logic 108 and configured to receive the exposure levels from function logic 108. The control circuitry 110 is also coupled to the pixel array 102 to control the operation of the pixel array 102. For example, the control circuitry 110 is configured to control an exposure time for each one of the pixel circuits in the pixel array 100 for a single frame. In particularly, the control circuitry 110 is configured to output each applied exposure level assigned to respective pixel subarray 104 of the pixel array 102 to control an exposure time of each pixel cell.

In some embodiments, the control circuitry 110 is connected to the pixel array 102 through normal exposure control lines 112 and base exposure control lines 114. The normal exposure control line 112 is coupled to transmit (or pass) the exposure time from the control circuitry to each pixel row of the pixel array 102. The base exposure control line 114 is coupled to transmit (or pass) the exposure time from the control circuitry 110 to each pixel row of the pixel array 102 that includes both the normal pixel cell and the base pixel cell. In some embodiments, the exposure time of each base pixel cell is controlled separately and in parallel to the exposure time of each normal pixel cell in the same row.

The image application device 198 is coupled to the image memory 122 of the function logic 108. The image application device 198 is configured to receive image data from the image memory 122 of the function logic 108 and to provide image data to one of a display and a data transmitter.

Figure 3:
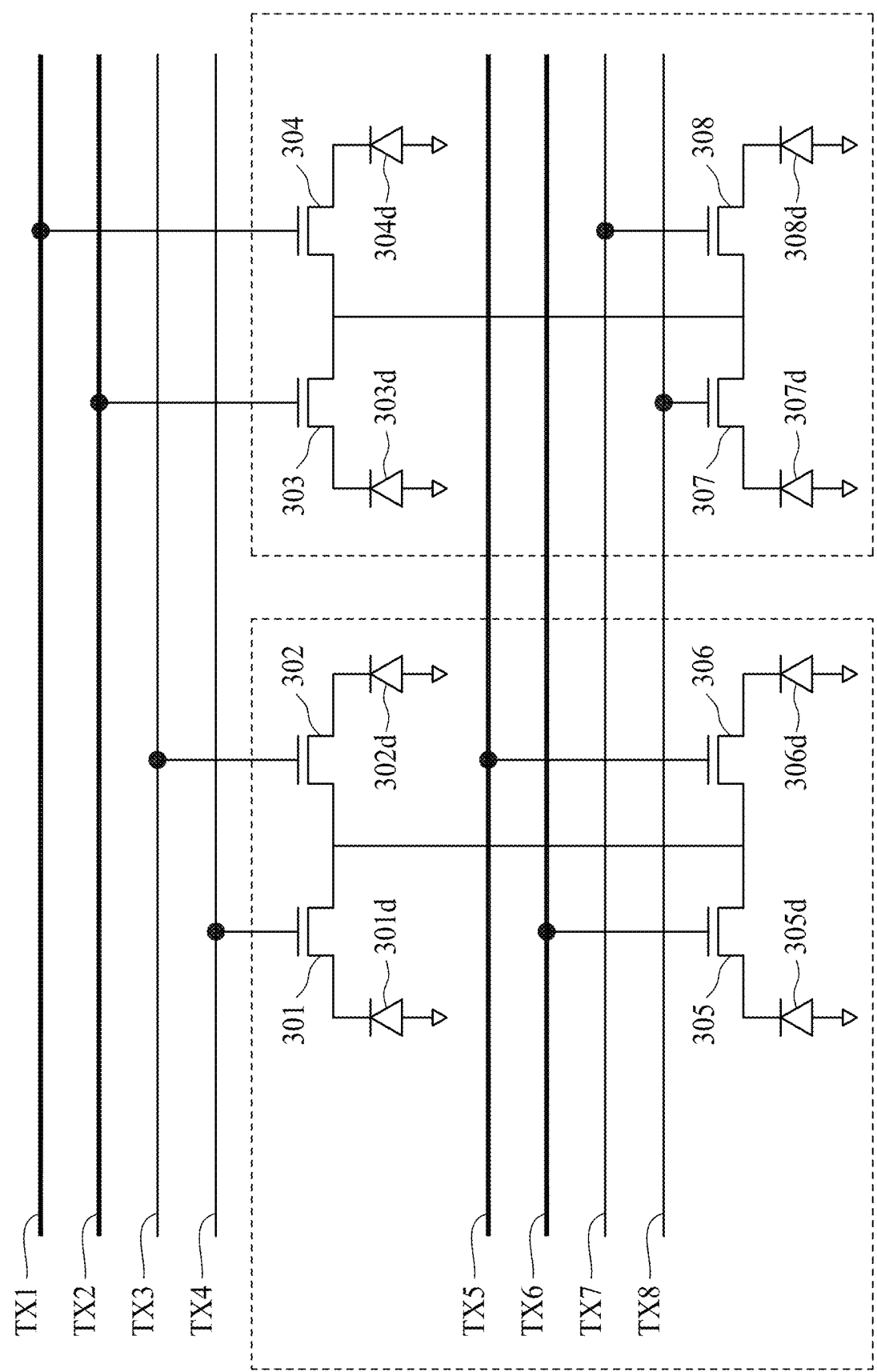
FIG. 3 is a circuit diagram showing an example of the circuitry of pixel cells of the pixel array illustrated in FIG. 1A in accordance with some embodiments of the present disclosure.

FIG. 3 is a circuit diagram showing an example of the circuitry of pixel cells of the pixel array 102 (or a portion of the pixel cells of the pixel array 102) illustrated in FIG. 1A in accordance with some embodiments of the present disclosure.

The circuit shown in FIG. 3 includes a plurality of pixel circuits (or transistors) 301, 302, 303, 304, 305, 306, 307 and 308 and a plurality of transmission lines TX1, TX2, TX3, TX4, TX5, TX6, TX7 and TX8. Each pixel circuit is connected to or defines a respective pixel cell (e.g. the pixel cells as shown in FIG. 1B). Each of the pixel circuit includes or is electrically connected to a photodiode (e.g., 301$d$, 302$d$, 303$d$, 304$d$, 305$d$, 306$d$, 307$d$ or 308$d$) that adapted to accumulate image charge in response to incident light. In one example, the incident light may be light that is focused onto the pixel circuit through a lens and/or a filter.

In some embodiments, the pixel circuit 301 defines a red normal pixel cell, the pixel circuit 302 defines a green normal pixel cell, the pixel circuit 303 defines a red base pixel, the pixel circuit 304 defines a green base pixel cell, the pixel circuit 305 defines a green base pixel cell, the pixel circuit 306 defines a blue base pixel cell, the pixel circuit 307 defines a green normal pixel cell and the pixel circuit 308 defines a blue normal pixel cell. In some embodiments, the transmission line TX1 is a green base pixel transmission line, the transmission line TX2 is a red base pixel transmission line, the transmission line TX3 is a green normal pixel transmission line, the transmission line TX4 is a red normal pixel transmission line, the transmission line TX5 is a blue base pixel transmission line, the transmission line TX6 is a green base pixel transmission line, the transmission line TX7 is a blue normal pixel transmission line and the transmission line TX8 is a green normal pixel transmission line.

Still referring to FIG. 3, the pixel circuit 301 (e.g., the gate of the pixel circuit 301) is connected to the transmission line TX4, the pixel circuit 302 (e.g., the gate of the pixel circuit 302) is connected to the transmission line TX3, the pixel circuit 303 (e.g., the gate of the pixel circuit 303) is connected to the transmission line TX2, the pixel circuit 304 (e.g., the gate of the pixel circuit 304) is connected to the transmission line TX1, the pixel circuit 305 (e.g., the gate of the pixel circuit 305) is connected to the transmission line TX6, the pixel circuit 306 (e.g., the gate of the pixel circuit 306) is connected to the transmission line TX5, the pixel circuit 307 (e.g., the gate of the pixel circuit 307) is connected to the transmission line TX8 and the pixel circuit 308 (e.g., the gate of the pixel circuit 308) is connected to the transmission line TX7. Each pixel circuit is connected to a respective transmission line to receive a control signal and to be turned on/off by the control signal.

Figure 4:
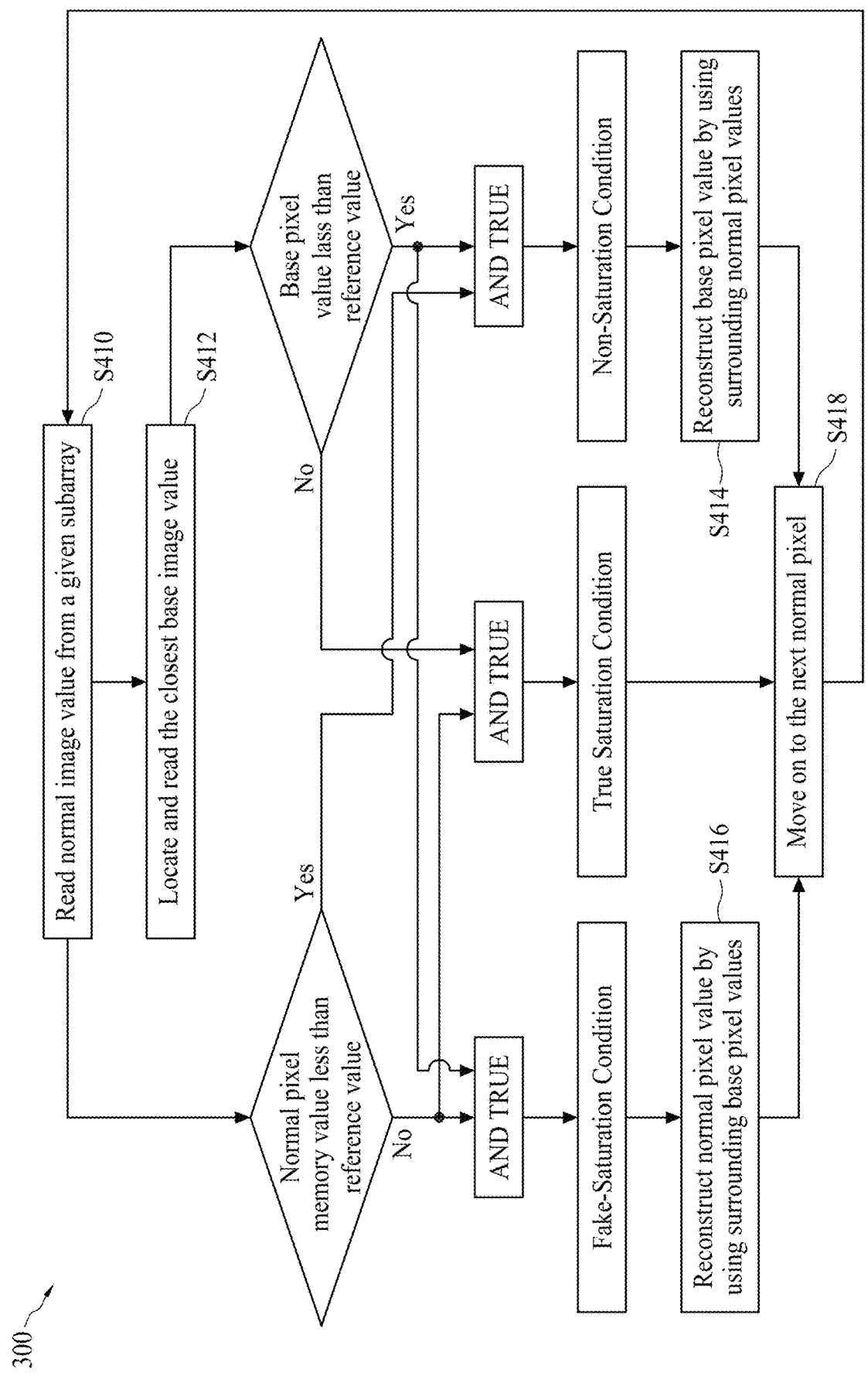
FIG. 4 is a flow chart illustrating operations for processing an image in accordance with some embodiments of the present disclosure.

FIG. 4 is a flow chart illustrating operations for processing an image in accordance with some embodiments of the present disclosure. The operations in FIG. 4 may be performed or implemented in the imaging system 100 shown in FIG. 1 or the imaging system 200 shown in FIG. 2. Alternatively, the operations in FIG. 4 can be implemented for any other imaging systems.

Referring to operation S410, a normal image value of a normal pixel cell is read. For example, in the imaging system 200 as shown in FIG. 2, the normal image value 225 of the normal pixel cell within or belonging to a given subarray is read from the normal pixel memory 224 by the normal pixel data reconstructor 254. In some embodiments, for example, in the imaging system 100 as shown in FIG. 1, prior to the operation S410, each pixel cell of the pixel array 102 may be preset or assigned with an exposure level. For example, one or more exposure levels are assigned to respective pixel subarrays 104 where said pixel cell resides. In the imaging system 200 as shown in FIG. 2, the exposure levels are read out from the exposure level memory 262 by the control circuitry 110. Each base pixel cell of the pixel array is preset or assigned with a base exposure level. In some embodiments, the base exposure level is the minimum level among all exposure levels applied to the pixel cells. As shown in FIG. 2, all exposure levels applied to the pixel cells are read out by the control circuitry 110 from the exposure level memory 270 and assigned for respective subarray of the pixel array.

Referring to FIG. 4, in operation S412, a base image value of a base pixel cell is located and read. In some embodiments, as shown in FIG. 2, the base image value 227 of the base pixel cell within or belonging to the given subarray is located and read from the base pixel memory 226 by the base pixel data reconstructor 256. In some embodiments, the base pixel cell is the pixel cell that resides the closest in distance to the normal pixel cell of the same color and of the same subarray. For example, the base pixel cell and the normal pixel cell belong to the same subarray and include the same color. The normal image value is then compared to a reference value and the base image value is compared to the reference value. In some embodiments, the normal image value 225 and the base image value 227 can be compared to the reference value 242 by the comparator 240 as shown in FIG. 2. In some embodiments, the reference value 242 is set to be the maximum value of the upper digitization limit of the ADC circuitry of the readout circuitry 106 as shown in FIG. 1. In some embodiments, the reference value may be defined by n-bit signals, where n is a positive integer. For example, if n is 8, the reference value is 255.

If both of the normal image value of the normal pixel cell and the base image value of the base pixel cell are the same as the reference value, the normal pixel cell is determined to be under a saturation condition (or true-saturation condition). For example, the comparator 240 as shown in FIG. 2 is configured to generate the reconstruction command 246 to preset the normal pixel cell in the saturation condition. Then the same operations (e.g., the operations S410 and S412) are carried out for the next normal pixel cell as shown in operation S418 in FIG. 4.

If the normal image value of the normal pixel cell is below the reference value and the base image value of the base pixel cell is below the reference value, the base pixel cell is determined to be under a non-saturation condition. For example, the comparator 240 as shown in FIG. 2 is configured to generate the reconstruction command 246 to preset the base pixel cell in the non-saturation condition. Referring to operation S414, a base pixel value is then generated or reconstructed by using the values of surrounding normal pixel cells under the non-saturation condition. The surrounding normal pixel cells are most approximate to the base pixel cell and are of the same color and are of the same subarray. For example, as shown in FIG. 2, the base pixel data reconstructor 256 is configured to generate or reconstruct the base pixel value based on the reconstruction command 246 and to transmit the reconstructed base pixel value 229 to the base pixel memory 226 to overwrite the base pixel memory 226 with the reconstructed base pixel value 229. Then the same operations (e.g., the operations S410 and S412) are carried out for the next normal pixel cell as shown in operation S418 in FIG. 4. Since the base pixel cell is assigned with a low exposure level (e.g., minimum exposure level), the base pixel cell has low signal-to-noise ratio (SNR). Reconstructing the base pixel cell using the surrounding normal pixel cells will increase or improve the SNR of the base pixel cell.

If the normal image value of the normal pixel cell is the same as the reference value and the base image value of the base pixel cell is below the reference value, the normal pixel cell is determined to be under a fake-saturation condition. For example, the comparator 240 as shown in FIG. 2 is configured to generate the reconstruction command 246 to preset the normal pixel cell in the fake-saturation condition. Referring to operation S416, a normal pixel value is then generated or reconstructed by using the values of surrounding base pixel cells under the fake-saturation condition. The surrounding base pixel cells are most approximate to the normal pixel cell and are of the same color and are of the same subarray. For example, as shown in FIG. 2, the normal pixel data reconstructor 255 is configured to generate or reconstruct the normal pixel value based on the reconstruction command 246 and to transmit the reconstructed base pixel value 228 to the normal pixel memory 224 to overwrite the normal pixel memory 224 with the reconstructed normal pixel value 228. Then the same operations (e.g., the operations S410 and S412) are carried out for the next normal pixel cell as shown in operation S418 in FIG. 4.

After the operations illustrated in FIG. 4 for all the normal pixel cells (or at least a predetermined number of the normal pixel cells) in a subarray are completely, exposure values are generated based on the reconstruction command associate with each normal pixel cell within the same subarray. The exposure values assigned to respective subarray are then stored, for example, in the exposure level memory 262 in the exposure level generator 260 as shown in FIG. 2. The control circuitry 110 can be configured to read the exposure levels from the exposure level memory 262 and to control the exposure times of each pixel of pixel array accordingly.

Figure 5A:
FIG. 5A illustrates a photo in accordance with some embodiments of the present disclosure.
Figure 5B:
FIG. 5B illustrates another photo in accordance with some embodiments of the present disclosure.

As mentioned above, when an object to be captured (or a camera with image sensor(s)) moves from a relatively dark environment to a relatively bright environment, a ghost image (or ghosting artifact) may occur or appear in the captured image. For example, as shown in FIG. 5A, which illustrates a photo with ghost images, which are circled by dotted-line circles. By reconstructing the normal pixel value of the normal pixel cell using the values of surrounding base pixel cells, the ghost image can be eliminated or mitigated. For example, as shown in FIG. 5B, the ghost images, which are observed in the photo as shown in FIG. 5A, are removed, eliminated or mitigated. In other words, the ghost images which are noticeable in the photo as shown in FIG. 5A disappear in the photo as shown in FIG. 5B.

What is claimed is:

1. A high dynamic range (HDR) imaging sensor, comprising:
   a pixel array of pixel cells, wherein each pixel cell comprises one of a normal pixel and a base pixel, and each M rows by N columns pixels defines a pixel subarray wherein each pixel subarray comprises at least three normal pixels and at least one base pixel;
   a readout circuitry coupled to read image data out from a plurality of pixels of the pixel array, the readout circuitry comprising an Analog-to-Digital Converter (ADC) associated to respective readout column and configured to convert the analog image signal to digital image data;
   a function logic coupled to receive the digital image data from the readout circuitry, wherein the function logic comprises:
      an image memory coupled to store the image data received from the readout circuitry; and
      a ghost image remover coupled to read image data stored in the image memory and write reconstructed data back to the image memory; and
   a control circuitry coupled to receive exposure levels from the function logic and to output each applied exposure level assigned to respective pixel subarray of the pixel array to control an exposure time of each pixel.

2. The HDR imaging sensor of claim 1, further comprising:
   a normal exposure control line coupled to pass the exposure time from the control circuitry to each pixel row of the pixel array; and
   a base exposure control line coupled to pass the exposure time from the control circuitry to each pixel row of the pixel array that includes both the normal pixel and the base pixel, wherein the exposure time of each base pixel is controlled separately and in parallel to the exposure time of each normal pixel in the same row.

3. The HDR imaging sensor of claim 1, wherein the image memory comprises:
   a normal pixel memory coupled to store and output normal pixel data to the ghost image remover and to be overwritten by reconstructed normal pixel data from the ghost image remover; and
   a base pixel memory coupled to store and output base pixel data to the ghost image remover and to be overwritten by reconstructed base pixel data from the ghost image remover.

4. The HDR imaging sensor of claim 1, wherein the ghost image remover comprises:
   a comparator coupled to compare image data with a reference value and to output a reconstruction command; and
   an image data reconstructor comprising:
      a normal pixel data reconstructor coupled to reconstruct normal pixel data based on the reconstruction command and overwrite the normal pixel memory in image memory; and
      a base pixel data reconstructor coupled to reconstruct base pixel data based on the reconstruction command and overwrite the base pixel memory in image memory.

5. The HDR imaging sensor of claim 4, wherein the comparator is configured to:
  compare the normal pixel data to the reference value;
  compare the base pixel data to the reference value; and
  output the reconstruction command based on the two comparing results.

6. The HDR imaging sensor of claim 4, wherein the reference value is the maximum value of the upper digitization limit of the ADC of the readout circuitry.

7. The HDR imaging sensor of claim 1, wherein each pixel subarray comprises:
  at least one red normal pixel cell,
  at least one green normal pixel cell,
  at least one blue normal pixel cell,
  at least one red base pixel cell,
  at least one green base pixel cell, and
  at least one blue base pixel cell.

8. The HDR imaging sensor of claim 1, wherein each pixel subarray comprises a plurality of Bayer patterns, and wherein each pixel subarray comprises:
  at least one red base pixel cell,
  at least two green base pixel cells, and
  at least one blue base pixel cell.

9. The HDR imaging sensor of claim 1, wherein the ghost image remover further comprises an exposure configuration generator coupled to:
  receive the reconstruction command;
  store exposure levels to an exposure level memory coupled to receive and store each exposure level corresponding to a different exposure time assigned to respective pixel subarray based on which pixel subarray the reconstructed pixel is read from in the image memory; and
  output the exposure level to the control circuitry.

10. The HDR imaging sensor of claim 1, wherein each pixel subarray comprises at least one black and white base pixel cell.

11. The HDR imaging sensor of claim 1, wherein each pixel subarray comprises at least one infrared base pixel cell.

12. A method of removing ghost image using base exposure pixel, comprising: presetting each pixel cell of a pixel array with an exposure level assigned to respective pixel subarrays where said pixel resides, wherein said exposure levels are read out from an exposure level memory by the control circuitry; reading normal image value of a normal pixel from a normal pixel memory by an normal pixel data reconstructor, wherein the normal pixel belongs to a given subarray; reading base image value of a base pixel from a base pixel memory by an base pixel data reconstructor, wherein the base pixel of the normal pixel is the pixel that resides the closest in distance to the normal pixel of the same color and of the same subarray; comparing the normal image value to a reference value by a comparator; and comparing the base image value to a reference value by the comparator.

13. A method of removing ghost image of claim 12, further comprising:
  presetting each base pixel of the pixel array with a base exposure level, wherein the base exposure level is the minimum level among all applied exposure levels, wherein all applied exposure levels are read out by the control circuitry from the exposure level memory, and wherein each applied exposure level is assigned for respective subarray of the pixel array.

14. A method of removing ghost image of claim 12, further comprising:
  setting the reconstruction command to preset a non-saturation condition by the comparator based on the normal image value being below the reference value and the base image value being below the reference value; and
  setting the reconstruction command to preset a fake saturation condition by the comparator based on the normal image value being the same as the reference value and the base image value being below the reference value.

15. A method of removing ghost image of claim 12, further comprising:
  reconstructing a base pixel value by calculating the values of surrounding normal pixels under the non-saturation condition, wherein the surrounding normal pixels that are most approximate the base pixel are of the same color and are of the same subarray, and wherein the image data reconstructor reconstructs the base pixel value and overwrites the base pixel memory with the reconstructed base pixel value; and
  reconstructing a normal pixel value by calculating the values of surrounding base pixels under the fake saturation condition, wherein the surrounding base pixels that are most approximate the normal pixel are of the same color and are of the same subarray, and wherein the image data reconstructor reconstructs the normal pixel value and overwrites the normal pixel memory with the reconstructed normal pixel value.

16. A method of removing ghost image of claim 12, further comprising:
  generating exposure values based on the reconstruction command associate with each normal pixel within the same subarray, and store each exposure values assigned to respective subarray to a memory in the exposure level generator;
  reading exposure levels from the memory of the exposure level generator by the control circuitry; and
  controlling the exposure times of each pixel of pixel array by the control circuitry.

17. A method of removing ghost image of claim 12, comprising:
  setting the reference value to be the maximum value of the upper digitization limit of the ADC of the readout circuitry.

18. A high dynamic range (HDR) imaging system, comprising:
  a pixel array of pixel cells for receiving lights from objects, wherein each pixel cell comprises one of a normal pixel and a base pixel, and each M rows by N columns pixels defines a pixel subarray wherein each pixel subarray comprises at least three normal pixels and at least one base pixel;
  a readout circuitry coupled to read image data out from a plurality of pixels of the pixel array, comprising an Analog-to-Digital Converter (ADC) associated to respective readout column to convert the analog image signal to digital image data;
  a function logic coupled to receive the digital image data from the readout circuitry, wherein the function logic comprises:
    an image memory coupled to store the image data received from the readout circuitry; and
    a ghost image remover coupled to read image data stored in the image memory and write reconstructed data back to the image memory;
  a control circuitry coupled to receive exposure levels from the function logic and output each applied exposure level assigned to respective pixel subarray of the pixel array to control an exposure time of each pixel;

a normal exposure control line coupled to pass the exposure time from the control circuitry to each pixel row of the pixel array;

a base exposure control line coupled to pass the exposure time from the control circuitry to each pixel row of the pixel array that includes both the normal pixel and the base pixel, wherein the exposure time of each base pixel is controlled separately and in parallel to the exposure time of each normal pixel in the same row; and an image application device coupled to receive image data from the image memory of the function logic and provide image data to one of a display and a data transmitter.

19. The HDR imaging system of claim 18, wherein the image memory comprises:

a normal pixel memory coupled to store and output normal pixel data to the ghost image remover and to be overwritten by reconstructed normal pixel data from the ghost image remover; and a base pixel memory coupled to store and output base pixel data to the ghost image remover and to be overwritten by reconstructed base pixel data from the ghost image remover.

20. The HDR imaging system of claim 18, wherein the ghost image remover comprises:

a comparator coupled to compare image data with a reference value and to output a reconstruction command; and an image data reconstructor comprising:

a normal pixel data reconstructor coupled to reconstruct normal pixel data based on the reconstruction command and to overwrite the normal pixel memory in image memory; and a base pixel data reconstructor coupled to reconstruct base pixel data based on the reconstruction command and to overwrite the base pixel memory in image memory.

21. The HDR imaging system of claim 20, wherein the comparator is configured to compare the normal pixel data to the reference value;

compare the base pixel data to the reference value; and output the reconstruction command based on the two comparing results, wherein the reference value is the maximum value of the upper digitization limit of the ADC of the readout circuitry.

22. The HDR imaging system of claim 18, wherein each pixel subarray comprises:

at least one red normal pixel cell, at least one green normal pixel cell, at least one blue normal pixel cell, at least one red base pixel cell, at least one green base pixel cell, and at least one blue base pixel cell.

23. The HDR imaging system of claim 18, wherein each pixel subarray comprises a plurality of Bayer patterns, and wherein each pixel subarray comprises:

at least one red base pixel cell, at least two green base pixel cells, and at least one blue base pixel cell.

24. The HDR imaging system of claim 18, wherein the ghost image remover further comprises an exposure configuration generator coupled to:

receive the reconstruction command;

store exposure levels to an exposure level memory coupled to receive and store each exposure level corresponding to a different exposure time assigned to respective pixel subarray based on which pixel subarray the reconstructed pixel is read from in the image memory; and output the exposure level to the control circuitry.

* * * * *